Figure 2:
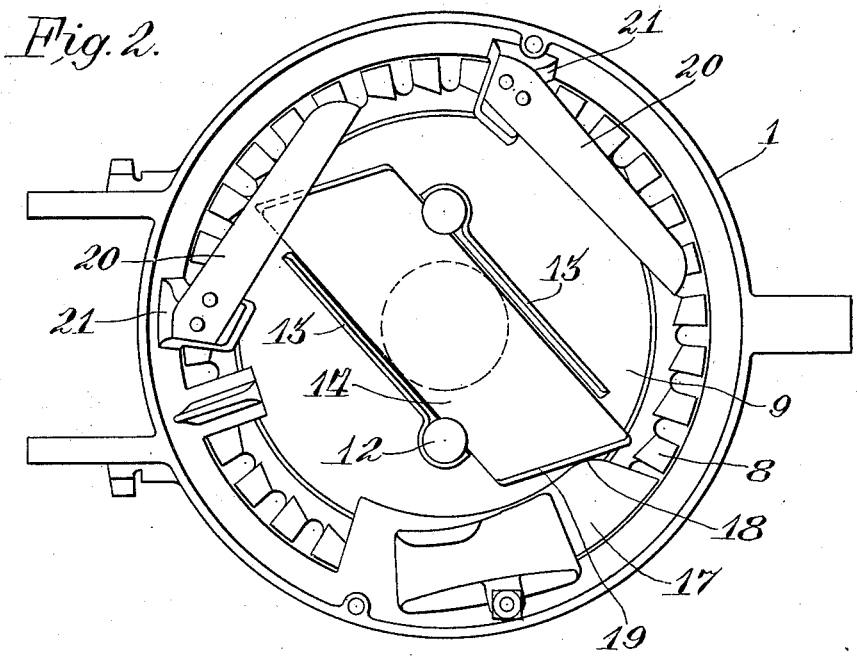

Oct. 20, 1931.  W. L. BEALL  1,828,519

AGITATOR FOR DISPENSING MECHANISMS

Filed July 1, 1929

Inventor
William L. Beall
By H. P. Davieb
Atty.

Patented Oct. 20, 1931

1,828,519

UNITED STATES PATENT OFFICE

WILLIAM L. BEALL, OF CHATTANOOGA, TENNESSEE, ASSIGNOR TO INTERNATIONAL HARVESTER COMPANY, A CORPORATION OF NEW JERSEY

AGITATOR FOR DISPENSING MECHANISMS

Application filed July 1, 1929. Serial No. 375,155.

This invention relates to an agitating device. It is particularly adapted for use in dispensing devices, such as corn and cotton planters and fertilizer distributors.

My object is to provide an agitator composed of a minimum number of parts, which is positive and satisfactory in operation. I attain this object by mounting an agitating member for movement relative to a rotating plate and providing a cam surface which periodically engages portions of the agitating member. The device is suitable for use wherever it can be mounted on a moving part within or forming a wall of a hopper or container. The stationary cam surfaces and the cam portions on the agitating member may be so shaped and positioned that the agitating member may be mounted on an oscillating or reciprocating, as well as on a rotating plate.

Although it is evident that this invention has a general application, it is illustrated and described in connection with a grain planter. In the drawings:—

Figure 1:
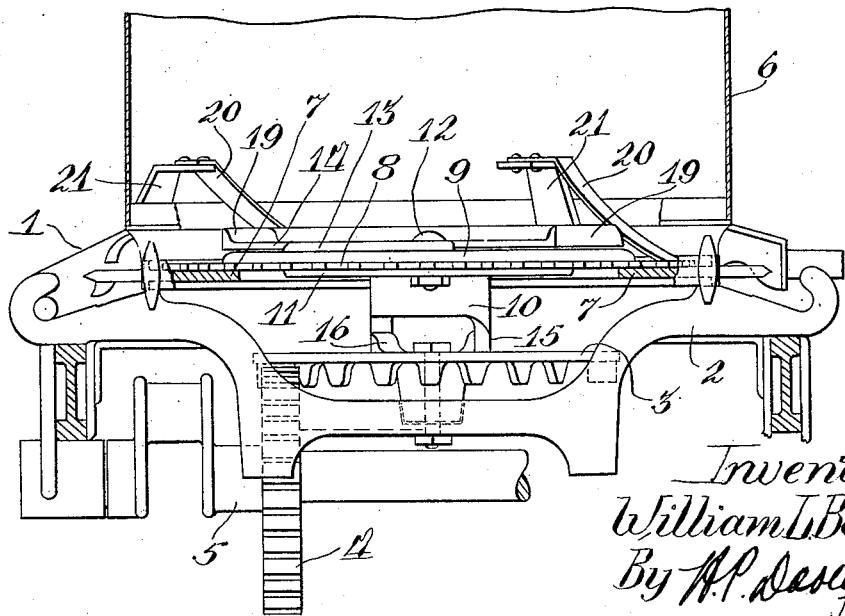

Figure 1 is a side elevation, partly in section, of the agitating device and such parts of a planter as are desirable to show its operation; and, Figure 2 is a top plan view of the seed hopper supporting base shown in Figure 1 and the agitating device as positioned within it.

The planter mechanism shown in the drawings is of a conventional type in which a seed hopper supporting base 1 is hinged to a portion of the frame structure 2. A gear 3, rotatably mounted on the frame structure 2, engages a gear 4 carried by a shaft 5, which is rotatably mounted with respect to the frame structure.

The supporting base 1 carries a seed hopper 6 and a seed dropping mechanism, the construction of which is well known to those skilled in the art. It comprises a stationary annular plate 7, which is rigidly fitted between the hopper base 1 and the frame structure 2, and an assembly mounted for rotation composed of a conventional seeder plate 8, a circular plate 9 having an integral hub extension 10, and a plate 11. Bolts 12 clamp the plates 8, 9 and 11 together.

The extension 10 on the plate 9 has projections 15, which are engaged by the lugs 16 on the gear 3. The casing 17 is integral with and projects inwardly from the hopper base. It houses a conventional knocker mechanism for periodically discharging grain from the seed plate, not shown, as it is not a part of this invention. The casing 17 is also shaped to form a cam surface 18.

The plate 9 is provided with parallel, upwardly extending guide members 13 for the agitating member 14, slidably fitted between them. The member 14 is substantially shorter than the diameter of the plate 8 and has angularly disposed, upturned flanges 19 at the ends. Spring members 20 are rigidly attached to projections 21 on the hopper base at one of their ends and resiliently engage the seed plate 8 in the path taken by the flanges 19 on the agitating member during rotation.

In the operation of the planter, the seed plate assembly is rotated at a predetermined rate. The angularly disposed flanges on the agitating member, slanted in the direction of the leading edge, engage the cam surface 18 or the casing 17. The agitating member is thereby pushed transversely across the rotating plate. The opposite flanges are alternately engaged, giving the agitating member a reciprocating movement with respect to the plate.

As previously pointed out in the description, the free ends of the spring members 20 engage the seed plate in the path followed by the flanges 19. Upon rotation, the flanges lift the ends of the spring member and free them from any accumulation of foreign material which might interfere with the operation of the planter.

Although applicant's agitating device has been shown and described in connection with a grain planter, it is to be understood that it is equally well adapted for other purposes where agitation is desired, and that the invention is limited only by the scope of the appended claims.

What is claimed is:

1. An agitating device comprising a rotating plate, an agitating member above said plate and mounted for transverse movement with respect thereto, and a single means for reciprocating said member with respect to the plate.

2. An agitating device comprising a rotating plate, an agitating member above said plate and mounted for transverse movement with respect thereto, and a single stationary means positioned to actuate the agitating member alternately in opposite directions with respect to the plate upon rotation thereof.

3. An agitating device comprising a rotating plate having parallel guides thereon, an agitating member mounted for reciprocating movement in said guides, and stationary means positioned to alternately engage the opposite ends of the agitating member upon rotation of the plate.

4. An agitating device comprising a hopper, a plate mounted for rotation in said hopper, an agitating member mounted above the plate for transverse motion with respect thereto, means for rotating the plate, and means rigid with respect to the hopper positioned to alternately engage opposite ends of the agitating member.

5. An agitating device comprising a hopper, a plate mounted for rotation in said hopper, an agitating member mounted above the plate for transverse motion with respect thereto, said agitating member being provided at the ends with angularly disposed flanges, means for rotating the plate, and means rigid with respect to the hopper positioned to alternately engage the flanges at opposite ends of the agitating member.

6. In a dispensing device, a hopper, a rotating plate in the bottom thereof, means cooperating with the plate for periodically dispensing portions of the contents of the hopper, an agitating member mounted for movement transversely across said plate, and means rigid with respect to the hopper for alternately engaging the ends of said agitating member.

7. A grain planter comprising a hopper, a seed plate mounted for rotation in the bottom of said hopper, means for periodically discharging the seed from said plate, an agitating member mounted for rotation and for transverse movement with respect to the seed plate, and means rigid with respect to the hopper positioned to alternately engage the ends of said agitating member.

8. An agitating device comprising a hopper, a plate mounted for rotation in said hopper, an agitating member mounted on said plate, means for rotating said plate, means for reciprocating the agitating member with respect to the plate during its rotation, and a spring member attached to the hopper and resiliently engaging the plate in the path followed by the ends of the agitating member.

In testimony whereof I affix my signature.
WILLIAM L. BEALL.